Patented Jan. 2, 1923.

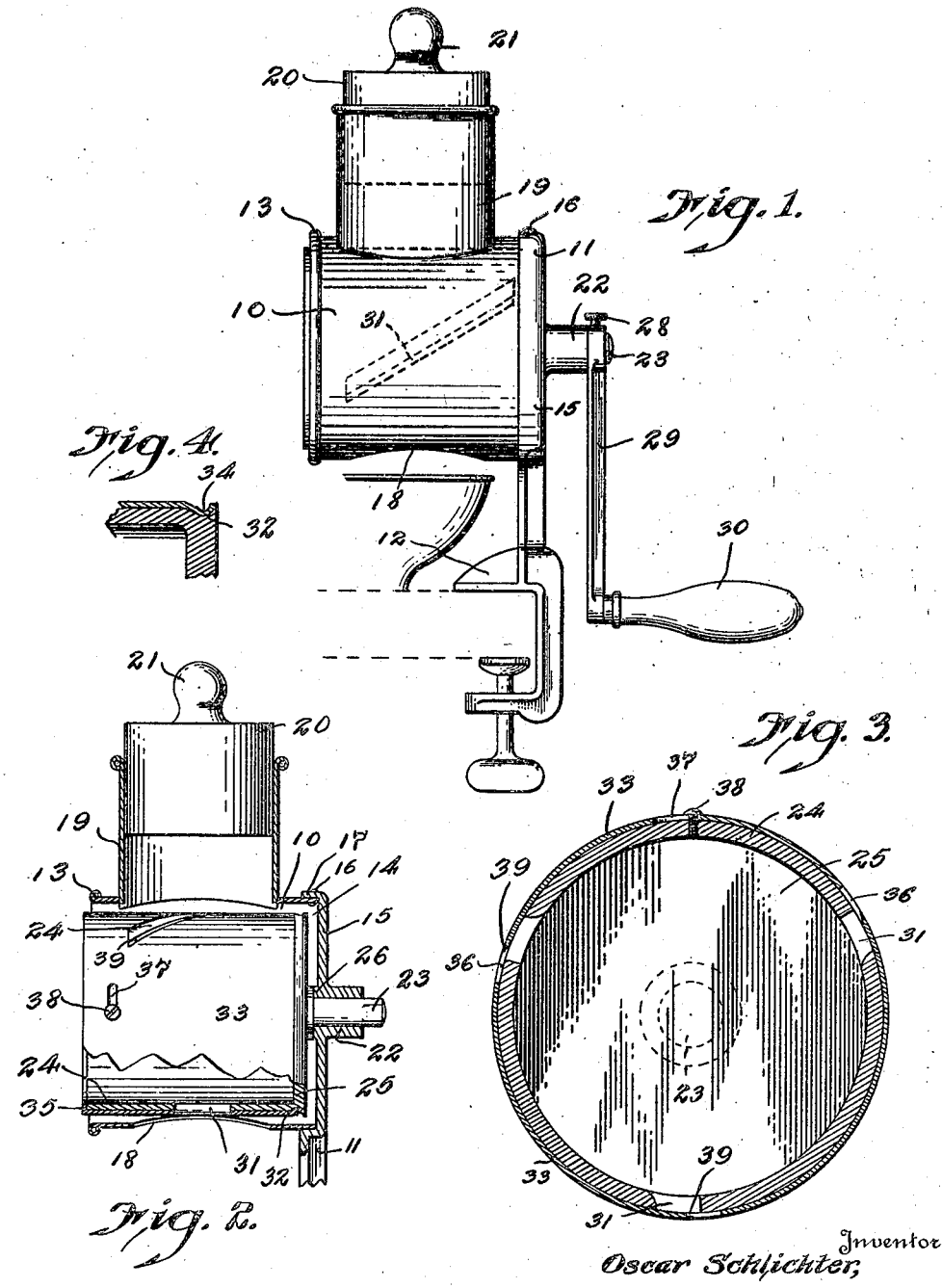

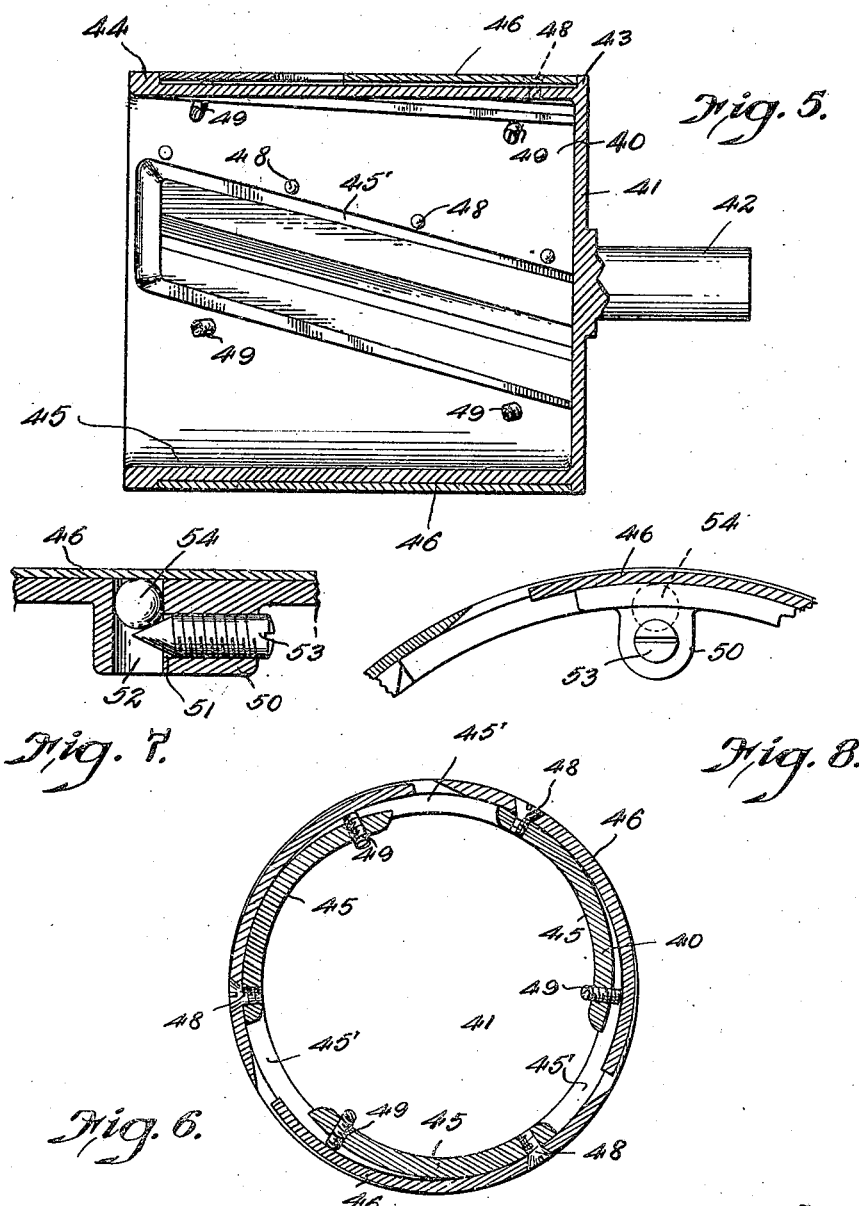

1,440,631

UNITED STATES PATENT OFFICE.

OSCAR SCHLICHTER, OF HAMILTON, OHIO.

SLICING MACHINE.

Application filed March 22, 1921. Serial No. 454,336.

*To all whom it may concern:*

Be it known that I, OSCAR SCHLICHTER, a citizen of the United States, residing at Hamilton, in the county of Butler and State of Ohio, have invented certain new and useful Improvements in Slicing Machines, of which the following is a specification.

The invention has for an object to effect improvements in that type of meat and vegetable slicers, in which a hollow cylindrical rotating mandrel carrying blades operating over slots in the mandrel beneath a feed hopper is employed. It is an especial aim to effect economies in the manufacture. It is also an important aim of the invention to effect improvements in functions. Another important aim is to enable the ready maintenance, adjustment and repair of the device. It is an especial purpose of the invention to provide a novel, efficient and cheap cutter and adjustment whereby various thicknesses of slices may be produced. Additional objects, advantages and features of invention will appear from the arrangement and combination of parts hereinafter shown, and more particularly described. In the drawings, Figure 1 is an elevational view of the embodiment of my invention, Fig. 2 is a vertical sectional view thereof, Fig. 3 is a cross section of the mandrel and cutter, Fig. 4 is a detail, Fig. 5 is a longitudinal sectional view of a modified mandrel and cutter construction, Fig. 6 is a cross sectional view thereof, Fig. 7 is a fragmentary view of a further modification of the mandrel and blade.

Fig. 8 is a fragmentary view from the front at right angles to Fig. 7.

There is illustrated a meat and vegetable slicer machine comprising a cylindrical sheet metal casing 10 mounted in a cast frame 11 having a table clamping extension 12 therebelow. The casing 10 is disposed on a horizontal axis, and is formed with a rolled rim 13 at the forward end or mouth, while its rear end is of plain cylindrical form set snugly in a correspondingly shaped recess 14 of a circular plate 15 formed integrally with the frame, rivets 16 being engaged through the circumscribing flange 17 of the recess and the inserted end portion of the casing. A drain opening 18 is formed in the lower side of the casing, and inserted in a rectangular opening in the upper side of the casing, there is a vertical hopper 19 soldered or otherwise secured to the casing 10. The hopper 19 has parallel opposite sides, and vertically reciprocable therein there is a plunger 20, which may be formed of wood, and it has a knob 21 at the upper side by which it may be manipulated. The corners of the hopper are preferably rounded to facilitate cleaning; and it is also formed with a rolled rim at the upper edge by which it is reinforced.

The opening 18 in the lower side of the casing permits the escape of juices readily from the knives, and makes it possible to collect the juice separately from the solid parts of the product. The casing is so located on the frame that when clamped upon a table, as shown in Fig. 1, a dish may readily be set upon the table top extending under the opening 18. The plate 15 is formed with a bearing sleeve 22 receiving revolubly the stud shaft 23 of a cylindrical hollow mandrel 24, having an integral closed head portion 25 at the inner end from which the shaft 22 is extended. The head is spaced from the plate 15 by suitable bosses on the plate and head.

One side of the shaft 23 is flattened to receive the set screw 28 in the bored hub of a crank 29 snugly fit on the shaft and having a handle 30, by which the device is operated. The mandrel is formed with a plurality of longitudinally extending diagonal slots 31, which stop short of the outer end of the mandrel, but extend fully to the head 25 at their inner ends. The mandrel is provided with a circumscribing peripheral groove 32, intermediately of the thickness of the head 25, the forward side of which groove is inclined outwardly.

Snugly fitted upon the mandrel and revoluble thereon, there is a sheet metal slicing cylinder 33, extending completely over the mandrel, lying flush with the back face of the head 25. The cylinder has its rear end portion pressed into the groove 32 snugly, so that the cylinder will be retained upon the mandrel in proper alinement therewith, but also free for rotation. The inwardly pressed portion of the cylinder forms a stiffening rib 34, tending to preserve the form of the cutter properly under conditions of use. The forward end of the cutter is formed with an inturned flange 35, which end lies closely against the forward end of the mandrel 24. The cutter is formed with a multiplicity of slots 36, which may be alined with respective slots in the mandrel, and are ordinarily formed of a slightly less width circumferentially, than the slots 31 of the mandrel. The cutter is formed with a short slot 37 at one point, intermediately of two slots 36, and customarily close to the outer end of the cutter, through which is engaged a binding screw 38 having threaded engagement in the body of the mandrel 24. By means of the screw 38 adjustment of the slots 36 of the cutter relatively to the slots in the mandrel may be fitted as desired, for various uses, to cut thick or thin slices, as will be more fully explained.

It is presumed that the device will be operated in a clockwise direction, and the edges of the slots 36 which will advance are beveled toward the inner side of the cutter and suitably sharpened.

In the use of the appliance, when a product to be sliced is introduced into the hopper and pressed against the cutter 33 while being rotated, the cutting edges 39 will engage the stock being fed through the hopper, and by reason of the beveling of the edges toward the inner side, the stock will be drawn downwardly until it engages against the side of the slot 31 opposed to the cutting edge, which will determine the thickness of the slice cut, or, in case the cutter is adjusted with the cutting edges fully spaced from the opposed edges of the slot 36, the opposed edges in the cutter would then be positioned over the corresponding edges of the slot in the mandrel, and function similarly. The slots in the cutter are preferably made narrower than the slots in the mandrel, in order that the users will be deterred from adjusting the cutting edges of the cutter so far back that they will come too close to the corresponding edges of the slots in the mandrel, which would cause the sliced stock to strike abruptly against the side of the slots in the mandrel, or if the cutter were still further back would prevent slicing at all. The slot 37 is of such length and so positioned that the maximum rearward adjustment of the cutter will still leave the cutting edges 39 in advance of the adjacent corresponding edges of the slots in the mandrel.

In Figs. 5 and 6 there is shown a construction of mandrel and cutters suitable for use in large machines as well as small, in this instance, the mandrel 40 is formed with a closed head 41 and integral shaft 42 as before, but the mandrel body proper is formed with peripheral flanges 43 and 44 at the inner and outer ends respectively, the slots 45′ of the mandrel are wider, and preferably beveled toward the inner sides and at their outer ends. The outer ends of the slot are coincident with the inner sides of the flanges 44. The intervening pallet portions 45 between the slots of the mandrel are all eccentric on the outer faces, the distance from the axis of the mandrel at the advancing edges of the slot being greater than at the opposed or receding edges. The cutter means in this device comprises three separate blades 46, formed of heavy resilient sheet steel having diagonal front and back edges, and curved initially on an arc of much less radius than the radius of the mandrel, and having their edges at one side, beveled toward their concave face and suitably sharpened. The form and size of the blade is such that they may be set snugly between the flanges 43 and 44 with the diagonal edges alined with the slots of the mandrel. These blades are of such measurement circumferentially, that they project considerably over the slots in the mandrel. The edge portions of the blades adjacent the cutting edges are secured firmly against the pallet portions of the mandrel by means of a series of screws 48, this being the only means for holding the blades upon the mandrel. The back edges of the blades lie comparatively close to the cutting edges of the next blades. When thus secured, the back edges of the blades will bear inwardly upon the pallet portions of least radius, so that the back edges of the blade will be spaced considerably inwardly of the advancing cutting edges of the next adjacent blades. This will permit the cutting of slices of maximum thickness. In order to permit variations of the thickness of slices cut, means is provided for springing the back edge portions of the blade outwardly, in order to bear the stock outwardly sufficiently to lessen the thickness of the slices cut. Various means may be employed for this purpose. As shown in Figs. 5 and 6, set screws 49 are engaged through the edge portions of the pallet parts opposite the cutting edges of the blades, set with an inclination toward the outer end of the mandrel, so that a screw driver may be inserted in the open end of the mandrel to adjust the screws properly for the regulation of the thickness of slices. In order to facilitate the cleaning of the interior of the mandrel, these screws are formed without heads, and with rounded surfaces at their slotted ends.

In Figs. 7 and 8 there is shown a further means for effecting adjustments of the blades for regulation of thickness of slices. In this construction, lugs 50 are cast upon the inner side of the mandrel, in which longitudinal threaded openings 51 are formed, opening upon the front sides of the lugs and intersecting at their inner ends radial passages 52. In the threaded openings 51 there are set screws 53 having conical inner end portions, and in the outer parts of the passages 52 between the screws and blades 46 there are interposed balls 54 which, when the screws are fully retracted lie with their peripheries coincident with the periphery of the pallet portions of the mandrel, but when the screws are screwed inwardly, the balls will be forced outwardly bearing the blades 46 outwardly and effecting adjustment thereof for the purposes indicated.

By this construction, the blades may be quickly removed and sharpened whenever necessary, and returned to their places upon the mandrel, without disturbing the adjustments made previously.

What is claimed:

1. In a cutter of the character described, a cylindrical mandrel open at one end and having a plurality of blade pallets extended longitudinally thereof, respective blades having advanced cutting edges and secured closely adjacent said edges upon the pallet portions, said blades having rear edge portions alined with and in close spaced relation to and in advance of the cutting edges of next adjacent blades on the mandrel and having a set by which the rear edge portions tend to spring inwardly of the next adjacent cutting edges, and adjustable means to support said back edge portions.

2. In a machine of the character described, a cylindrical mandrel body having circumscribing flanges at each end, and blade pallet portions therebetween with intervening clearways for passage of stock, blade elements having cutting edges secured upon the pallet portions and having a set by which their rear edges tend to spring inwardly of the cutting edges of next adjacent blades, and adjustable means to bear the rear edges of the blades outwardly.

3. In a machine of the character described a mandrel element having a plurality of blade pallet portions, blades having advanced cutting edges secured upon the pallet portions and having rear edge portions tending to spring inwardly of the cutting edges of the adjacent blades, and means to bear said rear edge portion outwardly adjustably, including screw elements disposed within the mandrel.

4. In a machine of the character described a mandrel element having a plurality of blade pallet portions, blades having advanced cutting edges secured upon the pallet portions and having rear edge portions tending to spring inwardly of the cutting edges of the adjacent blade, and means to bear said rear edge portions outwardly adjustably, comprising a ball element movable outwardly beneath the rear edge portion of each blade and an inclined element adjustable in bearing upon the ball for the purposes described.

In testimony whereof I have affixed my signature in presence of two witnesses.

OSCAR SCHLICHTER.

Witnesses:
   H. L. KRAUTH,
   E. J. BLACK.